US006204891B1

(12) United States Patent
Florent (10) Patent No.: US 6,204,891 B1
(45) Date of Patent: Mar. 20, 2001

(54) METHOD FOR THE TEMPORAL FILTERING OF THE NOISE IN AN IMAGE OF A SEQUENCE OF DIGITAL IMAGES, AND DEVICE FOR CARRYING OUT THIS METHOD (75) Inventor: Raoul Florent, Valenton (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/899,943

(22) Filed: Jul. 24, 1997

(30) Foreign Application Priority Data

Jul. 24, 1996 (FR) .................................................. 96 09307

(51) Int. Cl.$^7$ ...................................................... H04N 5/21
(52) U.S. Cl. ............................................ 348/616; 382/275
(58) Field of Search ...................................... 348/616, 607, 348/618, 622; 386/47, 51; 382/275

(56) References Cited

U.S. PATENT DOCUMENTS

| 4,682,230 | * | 7/1987 | Perlman et al. ...................... | 348/616 |
| 4,807,033 | * | 2/1989 | Kusen et al. .......................... | 348/616 |
| 4,897,724 | * | 1/1990 | Veldhuis ................................ | 348/616 |
| 5,142,537 | * | 8/1992 | Kutner ................................... | 371/31 |
| 5,414,472 | * | 5/1995 | Hwang .................................. | 348/616 |
| 5,442,407 | * | 8/1995 | Iu ......................................... | 348/620 |

OTHER PUBLICATIONS

R.E. Kalman, "A New Approach to Linear Filtering and Prediction Problems", published in "Transactions of the ASME", Journal of Basic Engineering, Series 82D, pp. 35–45, 1960.*

Ari Nieminen et al, "A New Class of Detail Preserving Filters for Image Processing" in IEEE Transactions on Patterns Analysis and Machine Intelligence, Vol. PAI9, No. 1, Jan. 1987.*

* cited by examiner

Primary Examiner—Victor R. Kostak
(74) Attorney, Agent, or Firm—Dwight H. Renfrew (57) ABSTRACT

A method for temporal filtering of noise in an image of a sequence of digital images, formed as from a first instant (to) until a last instant (t), with pixels having intensity values which correspond to each instant and are referred to as samples, includes an evaluation, for a given pixel, of a temporally filtered sample ($P_t^P$) of the last instant by means of a first linear combination of the filtered sample ($P_{t-1}^c$) of the last instant by means of a first linear combination of the filtered sample ($P_{t-1}^c$) of the last instant but one whereto a first weight ($W_1$) has been assigned, and the noisy sample ($I_t^P$) of the last instant, modulated by a second weight ($W_2$) which is a probability value ($W_2=\beta_t^P$) concerning absence of a noise peak in this sample.

16 Claims, 5 Drawing Sheets

METHOD FOR THE TEMPORAL FILTERING OF THE NOISE IN AN IMAGE OF A SEQUENCE OF DIGITAL IMAGES, AND DEVICE FOR CARRYING OUT THIS METHOD

BACKGROUND OF THE INVENTION

1. Field of the Invention

The invention relates to a method for the temporal filtering of the noise in an image of a sequence of digital images as well as to a device for carrying out this method.

The invention can be used notably for the processing of medical images formed in an X-ray fluoroscopy mode by means of a system which utilizes a low-intensity X-ray beam and produces a sequence of noisy digital images of low contrast which must be filtered so as to remove the noise without degrading the details.

The temporal filtering operation consists in smoothing, as a function of time, a monodimensional signal which is referred to as a temporal signal and consists of the digitized intensity values of a pixel having a given location in the images of the sequence.

2. Description of Related Art

A temporal filtering method of this kind is already known from the publication by R. E. KALMAN entitled "A new approach to linear filtering and prediction problems", published in "Transactions of the ASME", Journal of Basic Engineering, Series 82D, pp. 35–45, 1960.

Kalman filtering is defined by a recursive equation which yields the filtered intensity of a current pixel of an image of the sequence as a function of hypotheses made a priori, as a function of the intensity of the pixel having the same location in the preceding image of the sequence, and as a function of a factor which is called a Kalman gain.

This equation can lead to several recursive algorithms. In one of these algorithms the Kalman gain is a function of the difference between the noisy intensity observed at a given instant and the filtered intensity observed at the preceding instant for a pixel of given location. If an intensity discontinuity occurs due to a movement or a noise peak, therefore, the temporal signal is smoothed ahead of the discontinuity, but not after the discontinuity. Therefore, this algorithm is not suitable for dealing with this type of intensity discontinuity.

It is a problem that, due to the very low intensity of the fluoroscopic X-ray beam, the images of the sequence are extremely noisy and frequently contain noise peaks.

It is another problem that, due to the fact that each image of the sequence is separated from the next image by a small time interval, an important event, for example the displacement of a small tool such as a catheter, may occur from one image to another. The filtering of the image in which the movement of this small object occurs should not distort or erase this object.

SUMMARY OF THE INVENTION

It is an object of the present invention to provide a temporal filtering method for the reduction of the noise in the successive images of a sequence of digital images, which method:

operates strictly in real time, which means that it produces the filtered current image as from the appearance of said current image observed, immediately and without image delay, irrespective of the image rate in the sequence;

is capable of eliminating the noise peaks;

does not erase or distort the small objects in motion.

The problem of real-time elimination of noise peaks is solved by means of a method for the temporal filtering of the noise wherein at a given pixel location a combination is formed of a temporally filtered sample of the last instant but one, whereto a first weight has been assigned, and a noisy sample of the last instant modified by a second weight which is a function of a probability value concerning absence of a noise peak in this sample. The problem of eliminating the noise without distorting the small objects in motion is solved by means of such a method. Further, a device for carrying out this filtering method offers the advantage that it can be simply put into operation and that it provides, strictly and exactly in real-time, effective temporal noise filtering with suppression of the noise peaks.

BRIEF DESCRIPTION OF THE DRAWINGS

The invention will be described in detail hereinafter with reference to the accompanying diagrammatic drawing; therein.

DETAILED DESCRIPTION OF THE PREFERRED EMBODIMENTS

I/X-ray device

Figure 1:
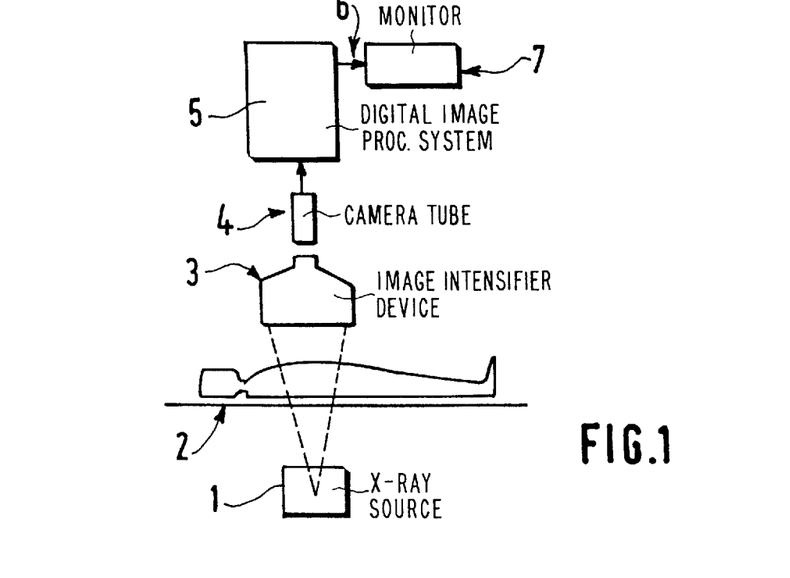
FIG. 1 shows an X-ray imaging device.

FIG. 1 shows, as an example of an application of the present method, a digital radiography system which includes an X-ray source 1, a table 2 for accommodating a patient, an image intensifier device 3 which is coupled to a camera tube 4 which applies data to a digital image processing system 5 which includes a microprocessor and is suitable for carrying out the present method. This microprocessor comprises a plurality of outputs, for example an output 6 which is coupled to a monitor 7 for the display of the sequence of radiographic images or intensity images.

The present invention takes into account neither the method used to acquire the sequence of digital images nor the nature of the objects represented thereby, but concerns exclusively the filtering of the images in this sequence so as to eliminate the noise and the noise peaks.

II/Temporal noise filtering method

The present invention proposes a method for the temporal filtering of noise successively in each image of a sequence of noisy digital images. This method performs the filtering of the last noisy image observed. Therefore, this method is performed strictly in real time.

Figure 2:
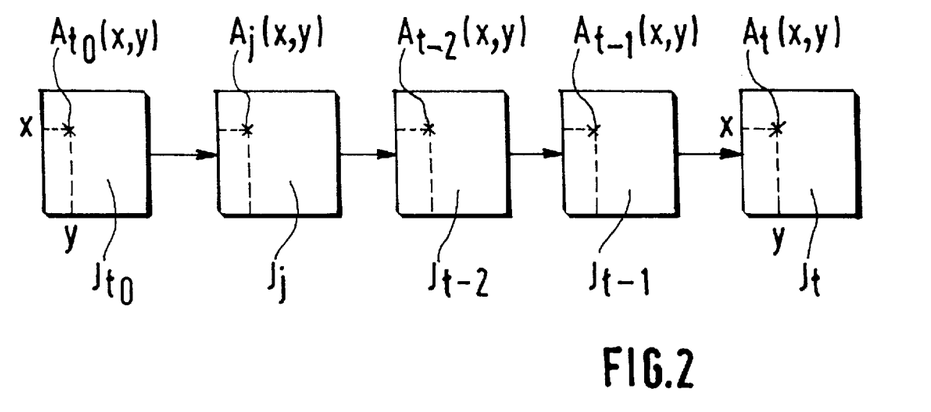
FIG. 2 shows a sequence of digital images.

As is shown in FIG. 2, this method includes the acquisition and the digitization of a sequence of noisy images which consists of past intensity images $J_j^c$ which are referred to as "causal images" and are formed from a first instant $t_o$ until an instant j=t−1, (also called the previous instant) where t is an instant which is called the present instant, and of an image $J_t^P$ which is being filtered, is referred to as the present image, and arrives at the present instant j=t. Each noisy digitized image $J_j$ is a two-dimensional matrix of pixels $A_j(x,y)$ which are designated by their co-ordinates x, y and an intensity level $I_j(x,y)$.

Figure 3A:
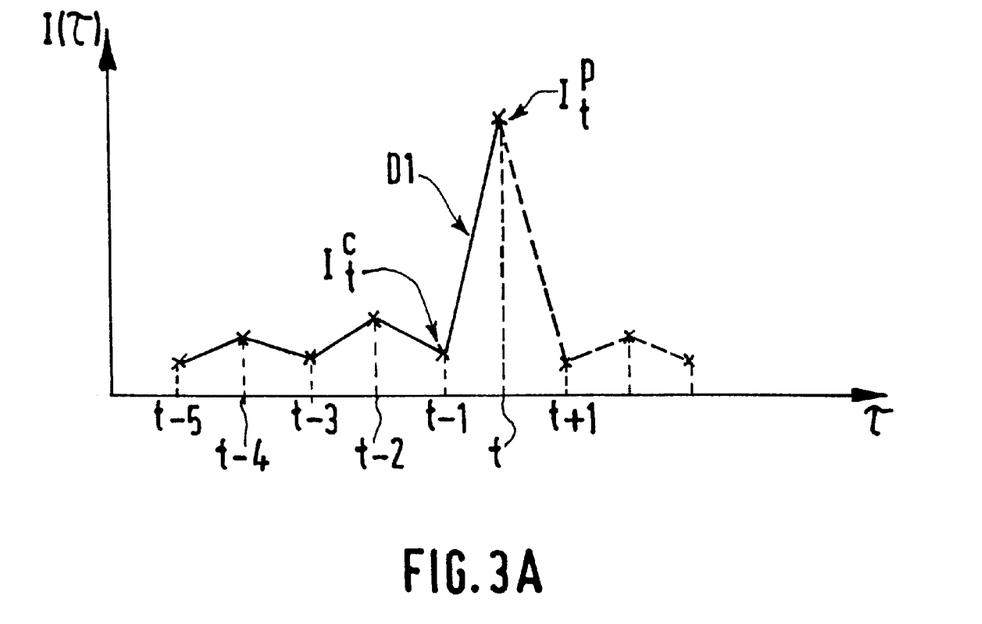
FIG. 3A shows a noisy temporal signal, corresponding to a pixel of given location with a noise peak.
Figure 3B:
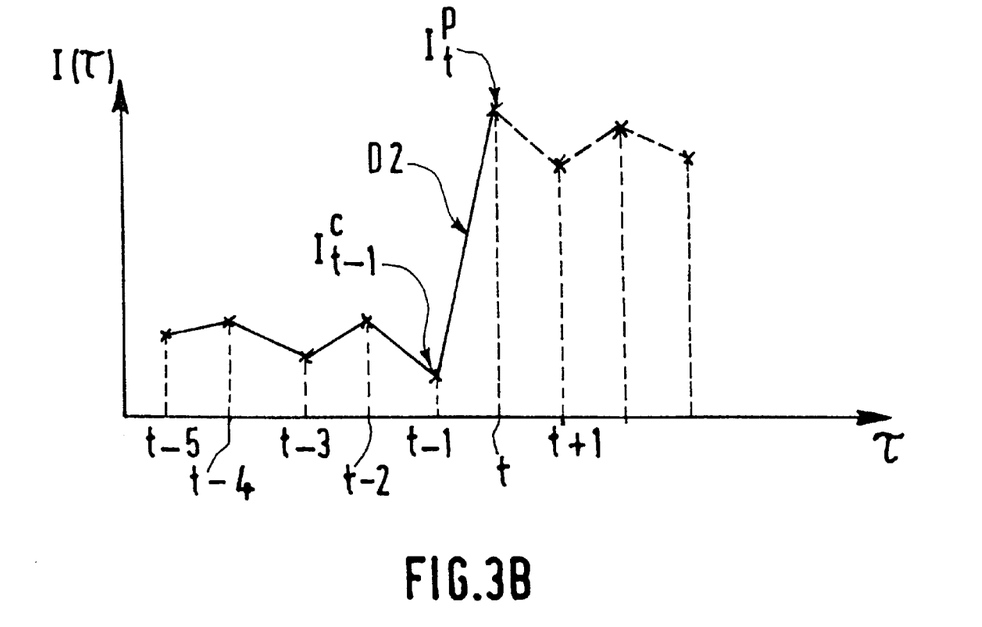
FIG. 3B shows another noisy temporal signal with a discontinuity due to a movement.
Figure 4A:
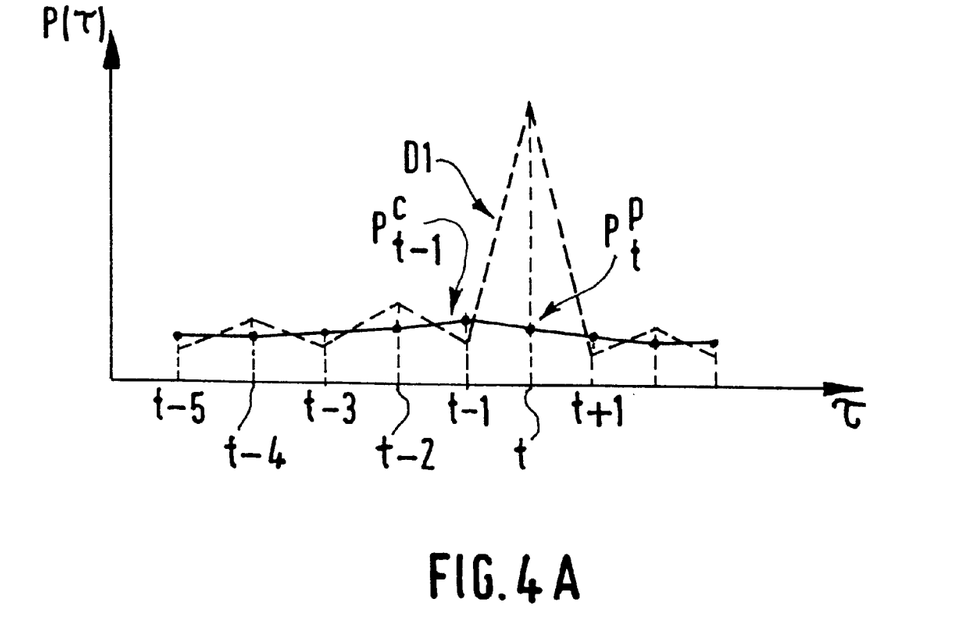
FIG. 4A shows a filtered temporal signal corresponding to the noisy temporal signal of FIG. 3A.
Figure 4B:
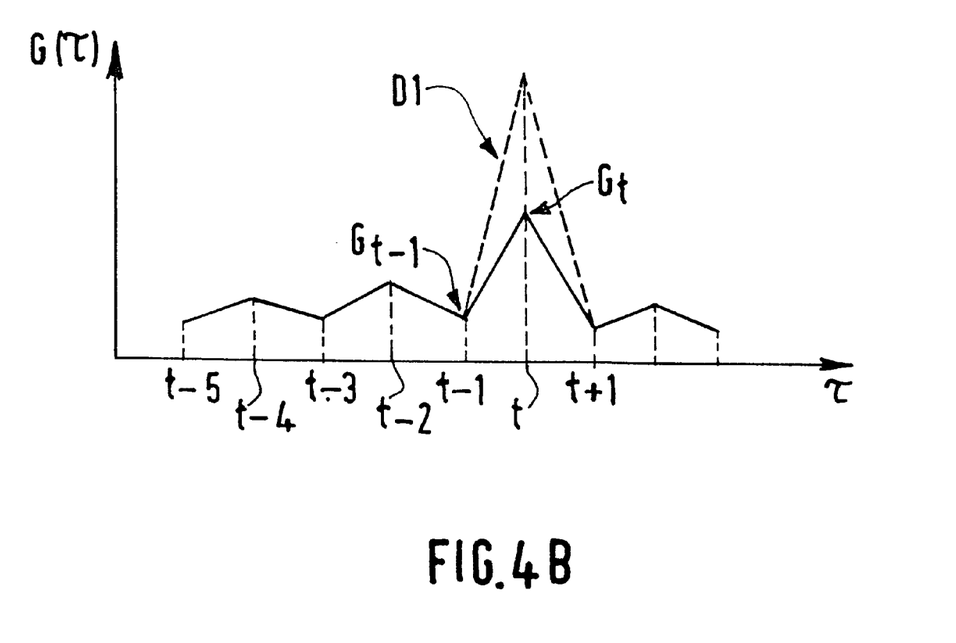
FIG. 4B shows a noisy temporal signal such as that shown in FIG. 4A after filtering by a spatial filter.

As is shown in the FIGS. 3A and 3B, a noisy temporal signal (Iτ) is formed with different intensity levels $I_j(x,y)$ in a given location x, y of a pixel $A_j(x,y)$ as a function of time τ. This method enables a filtered temporal signal P(τ) as shown in FIG. 4A to be obtained. "Samples" are to be understood to mean herein the intensities which are the points of the temporal signals I(τ) and P(τ). The past or causal samples are designated $I_j^c$ and the present sample is designated $I_t^P$.

This method performs a filtering operation on the noisy sample $I_t^P$ arriving at the present instant t and forms a filtered sample $P_t^P$. The temporal filtering operation is advantageously performed for each pixel $A_j(x,y)$ of the two-dimensional matrix, individually at the different coordinates x, y.

FIG. 3A shows a noisy temporal signal I(τ) with a noise peak D1 which appears as from the instant t−1, is centered around the instant t, and ultimately disappears again.

FIG. 3B shows a noisy temporal signal I(τ) with an intensity discontinuity D2 which occurs on the sample $I_t^P$ at the present instant t, due to a small local motion, and becomes manifest as a rising edge of the temporal signal I(τ), between the instant t−1 and the instant t, between a substantially low signal before the instant t−1, and a signal which remains substantially high after the instant t.

This temporal signal also has small sawteeth which are due to the noise; the intensity level constantly varies at the location (x, Y) and causes the effect of snow in the images of the sequence. The filtering operation enables elimination of this effect by smoothing the temporal signal I(τ) to a mean value in relation to a given pixel. This filtering operation also aims to eliminate the noise peaks such as D1.

In order to be eliminated, a noise peak such as D1 must be distinguished from an intensity discontinuity such as D2. To this end, the present method takes into account the fact that the noise peak D1 does not correspond to a purely spatial phenomena, as is the case for the discontinuity D2, but also corresponds to a temporal phenomenon.

The filtered sample $P_t^P$ for the reconstruction of the present noisy sample $I_t^P$ is expressed by the relation (1):

$$P_t^P = \frac{W_1 P_{t-1}^C + W_2 I_t^P}{W_1 + W_2} \quad (1)$$

According to the relation (1), the filtered sample $P_t^P$, or the filtered temporal signal at the present instant t, is a combination of the filtered causal sample $P_{t-1}^c$, evaluated at the last instant but one (also called the previous instant) and referred to as the last filtered causal sample, and the noisy sample $I_t^P$ observed at the present instant t. In the formula (1) for the filtered signal $P_t^P$ first and second weights $W_1$ and $W_2$ are assigned to the samples $P_{t-1}^c$ and $I_t^P$, respectively.

The denominator of the formula (1) is a normalization factor whose presence is based on the fact that the sum of the weights applied to the samples must be equal to 1 in order to ensure that the mean value of the filtered signal $P_t^P$ is equal to the mean value of the noisy signal $I_t^P$.

The present noisy sample $I_t^P$ in the formula (1) is modulated by a function of a value $\beta_t^P$ of the probability of absence of a noise peak at the present instant t. To this end, peak detection is performed on the temporal signal at the present instant t in order to evaluate the value $\beta_t^P$ of the probability of absence of a noise peak, and the weight $W_2$ assigned to the present noisy sample $I_t^P$ in the combination (1) is preferably a function of this probability value $\beta_t^P$ In an example $$W_2 = \beta_t^P \quad (2)$$

Figure 7A:
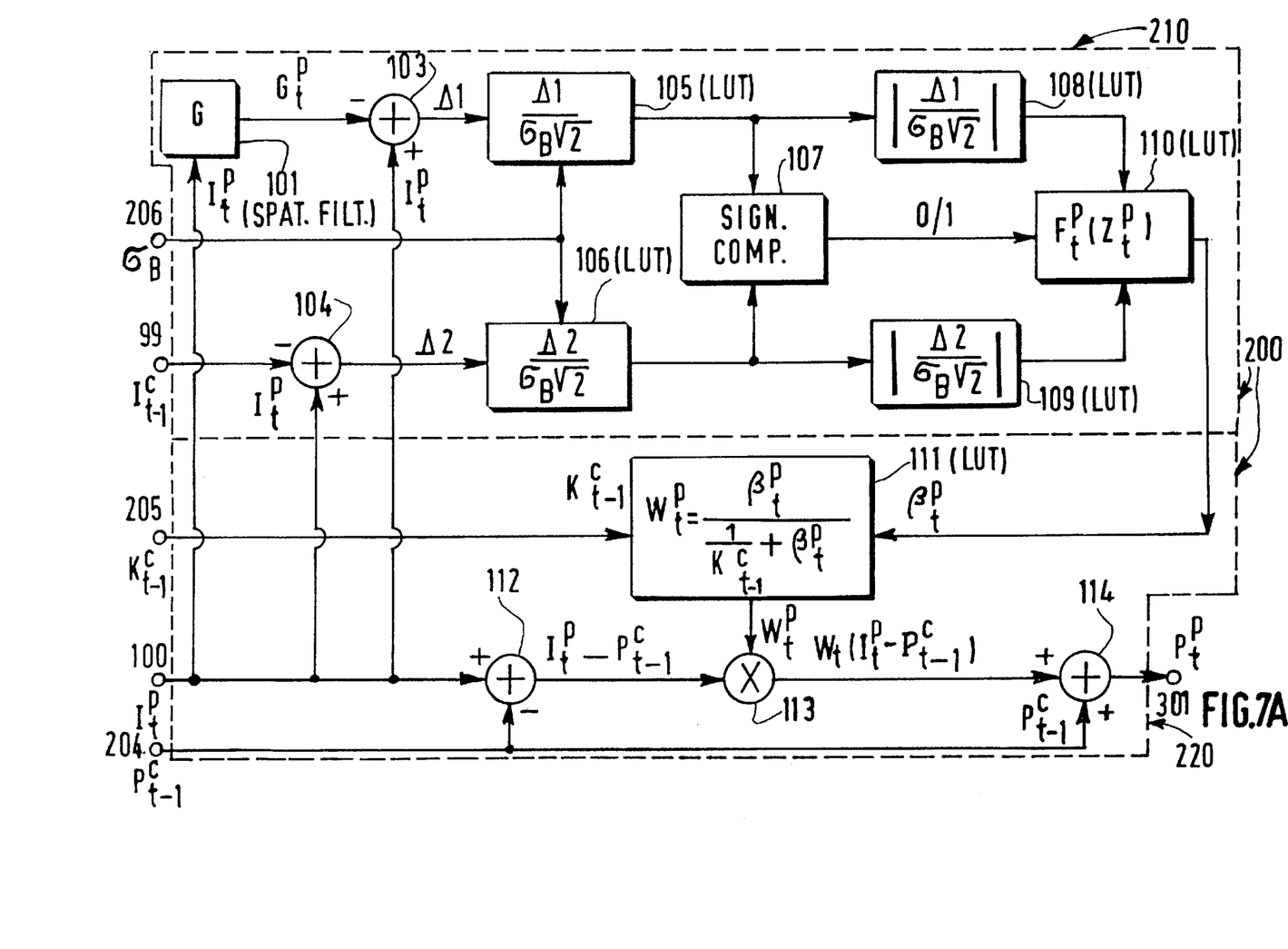
FIGS. 7A and 7B show in the form of functional blocks, a device for carrying out the temporal filtering method.

Referring to FIG. 7A, illustrating the present method by means of functional blocks, the noise peak detection performed on the present noisy sample $I_t^P$ includes:

application (101) of a spatial filter G to the present noisy sample $I_t^P$ in order to evaluate a present smoothed sample $G_t^P$:

evaluation (103) of a first difference Δ1, formed between the present noisy sample $I_t^P$ and the present smoothed sample $G_t^P$:

$$\Delta 1 = I_t^P - G_t^P \quad (3)$$

evaluation (104) of a second difference Δ2, formed between the present noisy sample $I_t^P$ and the last (or previous) noisy causal sample $I_{t-1}^c$:

$$\Delta 2 = I_t^P - I_{t-1}^c \quad (4)$$

comparison (107) of the signs of the two differences Δ1 and Δ2, evaluation (110) of a variable $Z_t^P$ which is larger than or equal to zero, so $Z_t^P \geq 0$.

The evaluation of the variable $Z_t^P$ is a measurement presuming the presence of a noise peak at the present instant t. Actually, a noise peak is a transitory phenomenon, both in the spatial and in the temporal domain.

The evaluation (103) of the first difference Δ1 between the noisy sample $I_t^P$ at the instant t and the spatially filtered sample $G_t^P$ relating to the same instant enables the transitory aspect to be revealed in the spatial domain.

Any spatial filtering function G which suppresses the local peaks of the signal, or the local extremes of the signal, is suitable for use so as to implement the spatial filtering of the noisy sample at the present instant t. This spatial filtering operation may be of the low-pass type, or preferably of the hybrid median type as described, for example in the publication: "A new Class of Detail Preserving Filters for Image Processing" by Ari NIEMINEN et al. in IEEE Transactions on Patterns Analysis and Machine Intelligence, vol. PAMI.9, No. 1, January 1987.

According to the invention one of the spatial filters 101 as described hereinafter is preferably applied to the noisy signal $I_t^P$.

Figures 5A, 5B, 6:
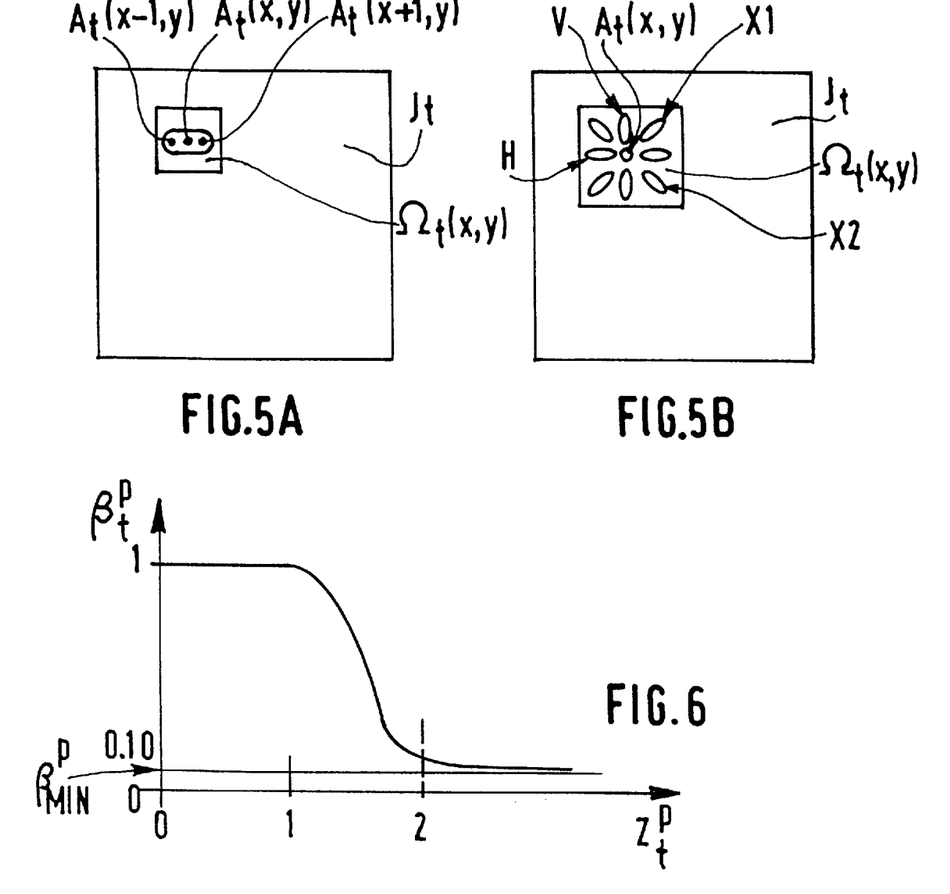
FIGS. 5A and 5B illustrate a first and a second embodiment of a spatial filter.
FIG. 6 shows a possible example of the modulation function for the present example in the temporal filtering function.

In FIG. 5A, showing a first embodiment of a spatial filter 101, a median filter of a few pixels, for example 3 pixels, is applied to the image $J_t$ to be treated and to the pixel $A_t(x,y)$. In a small window $\Omega_t(x,y)$ the filter 101, being centered around the current pixel $A_t(x,y)$, calculates the intensity of three adjacent pixels in a given direction, for example the horizontal direction, arranges their intensity values in the direction from the smallest to the highest intensity, and retains as the filtered intensity the intensity which is not the lowest intensity and not the highest intensity, i.e. the so-called median intensity. This median intensity $G_t^P$ is assigned to the current pixel $A_t(x,y)$.

In FIG. 5B, showing a second example of a spatial filter 101, a median filter which is defined by a window $\Omega_t(x,y)$, centered around x, y, is applied to the image $J_t$ to be treated and to the pixel $A_t(x,y)$, said filter having several feasible orientations, for example a horizontal orientation called H, a vertical orientation called V, and orientations according to a first diagonal, called X1, and according to a second diagonal, called X2.

The median value is first determined for each orientation. Subsequently, two new median values are determined by taking the result for the two orientations H and V with the intensity of the central point $A_t(x,y)$ on the one hand and the result for the two orientations X1 and X2 with the intensity of the central point $A_t(x,y)$ on the other hand. Finally, a last median value is determined by taking these two new values with the intensity of the central point $A_t(x,y)$. This last median value $G_t^P$ is assigned to the central point $A_t(x,y)$.

The evaluation (104) of the second difference $\Delta 2$ between the two temporally consecutive samples formed by the noisy sample $I_t^P$ at the instant t and the noisy sample $I_{t-1}^c$ at the preceding instant t-1 enables the transitory aspect to be revealed in the time domain.

The presence of a transitory phenomenon in the spatial as well as in the temporal domain, i.e. the presence of a noise peak, is detected when the differences $\Delta 1$ and $\Delta 2$ evaluated are coherent and exhibit an intensity variation in the same sense; this is substantiated by the signs of the two differences $\Delta 1$, $\Delta 2$ being the same.

The presence of the noise peak is assumed to be zero when the signs of the differences $\Delta 1$, $\Delta 2$ are different:

$$Z_t^P=0 \tag{5}$$

The presence of the noise peak is presumed to be revealed when the signs of the differences $\Delta 1$, $\Delta 2$ are the same::

$$Z_t^P \neq 0 \tag{6}$$

The presumption of the presence of a noise peak is then measured according to the invention by way of the relation:

$$Z_t^P = \text{Min}(\Delta 1, \Delta 2) \tag{7}$$

To this end, the method includes the evaluation (108, 109) of the absolute values of the differences $\Delta 1$ and $\Delta 2$ $$\Delta 1 = I_t^P - I_{t-1}^c \tag{8}$$

$$\Delta 2 = I_t^P - I_{t-1}^c \tag{9}$$

and the presumptive measurement $Z_t^P$ of presence of a noise peak is taken as the smallest value between the two absolute values of the differences $\Delta 1$, $\Delta 2$.

The method then includes the evaluation (110) of a probability of absence of a peak. This probability $\beta_t^P$ is evaluated as a non-strictly decreasing function $F_t^P$ of the variable $Z_t^P$ in conformity with the relation:

$$\beta_t^P = F_t^P \tag{10}$$

In order to ensure that the temporal filtering method, including these noise peak detection and probability evaluation steps, does not yield incorrect results in the case where at the same time:

a real intensity discontinuity exists in the past, implying that the process cannot be based on the causal samples preceding the discontinuity, and a noise peak exists at the present instant, implying that the method cannot be based on the present sample, so that the decreasing function $F_t^P$ is inhibited from assuming the value zero. This signifies that, according to the method, the probability $\beta_t^P$ of absence of a peak at the current instant t is never zero:

$$\beta_t^P \neq 0 \tag{11}$$

Referring to FIG. 6, a possible curve representative of the probability $\beta_t^P$ as a function of the variable $Z_t^P$ shows, by way of example, that:

the probability $\beta_t^P$ of absence of a peak amounts to 1 when the value $Z_t^P$ of the presumptive presence of a peak amounts to 0;

the probability $\beta_t^P$ of absence of a peak remains near 1 for the values $Z_t^P$ of the presumption of presence of a peak which are lower than 1;

the probability $\beta_t^P$ of absence of a peak tends towards a value $\beta_{MIN}^P$ for the values $Z_t^P$ of the presumptive presence of a peak which are higher than 2.

In the formula (1), the weight $W_2$ of the present sample $I_t^P$ is taken to be equal to the probability $\beta_t^P$ of absence of a peak. When the probability of absence of a peak is 1, it is certain that a peak is absent, and the reliability that must be attributed to the present sample $I_t^P$ is high. In order to translate this fact, the weight $W_2$ associated with the present example $I_t^P$ has the value 1, like the probability $\beta_t^P$, so:

$$W_2 = \beta_t^P = 1 \tag{12}$$

When the probability $\beta_t^P$ of absence of a peak is of the order of $\beta_{MIN}$, i.e. when it has a low value, it is quasi-certain that a peak is present and the reliability attributed to the present sample $I_t^P$ is low. In order to translate this fact, the weight associated with the present sample takes a small value, for example:

$$W_2 \cong \beta_{MIN} = 0.1 \tag{13}$$

Between these two values, the present sample $I_t^P$ is modulated, in the formula (1), by the probability value $\beta_t^P$ calculated as a function of the differences $\Delta 1$ and $\Delta 2$ as described above.

It is desirable that the curve $\beta_t^P$ as a function of the variable $Z_t^P$ is not dependent on the noise. In order to obtain this result, each of the differences $\Delta 1$ and $\Delta 2$ is normalized by the noise standard deviation $\sigma_B$, being a notion known to those skilled in the art.

It will be remembered that the noise standard deviation $\sigma_B$ is the square root of the variance $\sigma_B^2$ of the noise relating to a given sample. The variance of the noise is the mean value of the squared standard deviations of the noise in the area considered in the image $J_t$ with respect to the mean local intensity in this area.

For each difference $\Delta 1$, $\Delta 2$, the variance of the noise is approximately $2\sigma_B^2$. As a result, the noise standard deviation is approximately $\sigma_B\sqrt{2}$.

The differences used, therefore, are preferably the normalized differences $\Delta 1$ and $\Delta 2$ given by the relations:

$$\Delta 1 = \frac{I_t^P - G_t^P}{\sigma_B \sqrt{2}} \tag{14}$$

$$\Delta 2 = \frac{I_t^P - P_{t-1}^C}{\sigma_B \sqrt{2}} \tag{15}$$

This results in:

$$Z_t^P = \text{Min}\left(\frac{|\Delta_1|}{\sigma_B\sqrt{2}}, \frac{|\Delta_2|}{\sigma_B\sqrt{2}}\right) \quad (16)$$

The method described above enables a noise peak as shown in FIG. 3A to be distinguished from a discontinuity as shown in FIG. 3B, enables such a noise peak to be taken into account, and also enables elimination of this noise peak as shown in FIG. 4A.

According to this method, the last filtered causal sample must be calculated by temporal filtering which may be a recursive or a non-recursive process known to those skilled in the art. Preferably, the last (or previous) causal sample is calculated by a second combination so that:

$$P_{t-1}^C = \frac{\sum_{j=to}^{j=t-1} b_j^C \times I_j^C}{\sum_{j=to}^{j=t-1} b_j^C} \quad (17)$$

in which $I_j^c$ represents the noisy causal samples fetched from the images of the sequence at a given pixel location $A_t(x,y)$ from the first instant to until the last instant but one t-1, (also called the previous) and where $b_j^c$ represents the weights associated with each sample of the same index. The second combination is normalized by the sum of the weights $b_j^c$.

In an exemplary version of the method the weights $b_j^c$ may be constants assigned to the respective causal samples and empirically determined by a person skilled in the art. In that case, however, the problem of movement of very small objects is not completely solved.

Preferably, a weight $b_k^c$ of a given causal sample $I_k^c$ is the product of the probabilities of absence of a discontinuity $\alpha_j^c$, formed between this given causal sample $I_k^c$ and the present noisy sample $I_t^P$.

A discontinuity is to be understood to mean herein an intensity discontinuity between two consecutive samples of the series of causal samples, said discontinuity being due to a movement and hence linked to a spatial phenomenon, for example as shown in the FIGS. 3B and 2D. Thus:

$$b_k^C = \prod_{j=k+1}^{j=t} \alpha_j^C \quad (18)$$

By way of example, the formula for the causal weight $b_{t-1}^c$ linked to the noisy causal sample $I_{t-1}^c$ is:

$$b_{t-1}^c = \alpha_t^c \quad (19)$$

being the probability of absence of a discontinuity between the samples $I_{t-1}^c$ and $I_t^P$. The formula of the causal weight $b_{t-2}^c$ linked to the noisy causal sample $I_{t-2}^c$ is:

$$b_{t-2}^c = \alpha_t^c \times \alpha_{t-1}^c \quad (20) \text{ etc.}$$

Because of this formula, if an intensity discontinuity such as D2 occurs between the instant at which the sample $I_k^c$ arrives and the instant at which the present sample $I_t^P$ arrives, said sample $I_k^c$ is taken into account less in the second combination, because its weight is small. Only the samples for which an intensity continuity until the present sample exists are strongly taken into account in the second combination of the relation (17).

Depending on the temporal noise filtering method and the noise peaks, the last filtered causal sample in the formula (1) is evaluated in conformity with the formula (17) and the weight $W_1$ assigned thereto is given by said sum of weights of the second combination:

$$W_2 = \sum_{j=to}^{j=t-1} b_j^C \quad (21)$$

Preferably, by way of simplification the following expression is conceived:

$$\sum_{j=to}^{j=t-1} b_j^C = \frac{1}{k_{t-1}^C} \quad (22)$$

The expression of the formula (1) of the first combination for realizing the filtering of the noise peaks thus advantageously utilizes the following expression of a given third weight $W_t^P$:

$$W_t^P = \frac{\beta_t^P}{\frac{1}{K_{t-1}^C} + \beta_t^P} \quad (23)$$

in such manner that the evaluation of the filtered present sample is given by the relation:

$$P_t^P = (1-W_t^P)P_{t-1}^c + W_t^P I_t^P \quad (24a)$$

which is equivalent to the formula:

$$P_t^P = P_{t-1}^c + W_t^P(I_t^P - P_{t-1}^c) \quad (24b)$$

$$\text{or } P_t^P \frac{W_1 P_{t-1}^C + W_2 I_t^P}{W_1 + W_2} \quad (1)$$

or also equivalent to the expression:

$$P_t^P = \frac{\frac{1}{K_{t-1}^C} \times P_{t-1}^C + \beta_t^P \cdot I_t^P}{\frac{1}{K_{t-1}^C} + \beta_t^P} \quad (25)$$

which shows that the first combination (1) of the present sample $I_t^P$ is modulated by a coefficient of probability $\beta_t^P = W_2$ of absence of a noise peak, and that the last causal sample but one, $P_{t-1}^c$, has a weight $W_1$ which is the sum of the weights $1/K_{t-1}^c$ of the second combination (17) enabling the determination of said sample. Said first, second combinations and forms (24b) may be linear.

Using the preferred method described above for the determination of the last filtered causal sample but one and its weight $W_1$, the problem of eliminating the noise without distorting or erasing the small objects in motion, causing spatial discontinuities such as D2 of FIG. 3B, is completely solved.

III/Device for carrying out the filtering method

The formula (24b) can be readily evaluated by means of simple calculation means as will be described hereinafter.

Figure 7B:
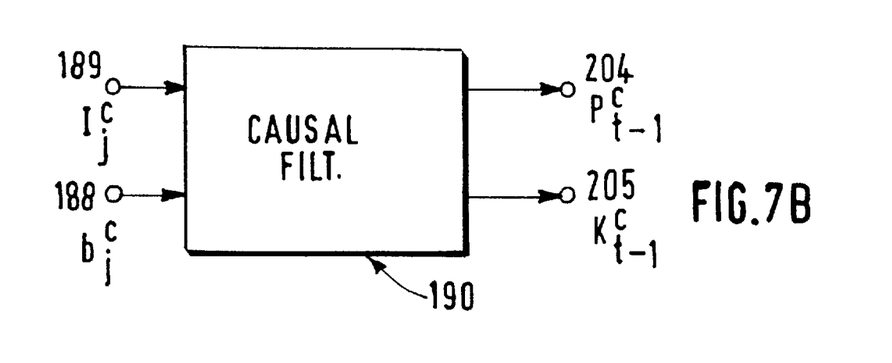

FIGS. 7A and 7B shows a simple device for carrying out the proposed filtering method which will be described in the form of functional blocks.

The device comprises first of all means (not shown) for extracting the noisy samples relating to a pixel $A_t(x,y)$, having a given location x, y in the digital images, from the first instant to until the present instant t.

Referring to FIG. 7B, the device subsequently includes a first assembly 109, called herein the causal temporal filtering assembly, for performing the evaluation, on the basis of noisy causal samples fetched in the period of time from to t-1, at the given location x, y, of the last filtered causal sample $P_{t-1}^c$, by means of linear filtering, with weights associated with the samples which are either constant or preferably functions of coefficients $\Delta_j^c$ of the probability of absence of a discontinuity as described above.

Recursive or non-recursive filters suitable for carrying out linear filtering are known to those skilled in the art and will not be described hereinafter. Such a linear filter 190 for performing causal filtering includes an input 189 for the noisy causal samples $I_j^c$ and an input 188 for the constant weights $b_j^c$ or in the preferred embodiment for products of $\alpha_j^c$, and its output 204 supplies the last filtered causal sample $P_{t-1}^c$ and, in the preferred version, the output 205 supplies the sum of the weights $$\sum_{j=t_0}^{j=t-1} b_j^C$$

in the inverse form which is supposed to be equal to $K_{t-1}^c$.

Subsequently, the device comprises conventional means which are not shown since they are known to those skilled in the art and serve to evaluate the noise standard deviation $\sigma_B\sqrt{2}$ on the basis of the variance of the noise $\sigma_B^2$ of the samples and the differences $\Delta 1$, $\Delta 2$.

Referring to FIG. 7A, the temporal filtering device for diminishing the noise peaks comprises essentially an assembly 200 with inputs which are:

an input 99 for the last causal noisy sample $I_{t-1}^c$, an input 100 for the present noisy sample $I_t^P$, an input 204 for the last filtered causal sample $P_{t-1}^c$ from the causal linear filter 190, an input 205 for the value $K_{t-1}^c$, from the causal linear filter 190, an input 206 for the evaluated values of the noise standard deviation $\sigma_B$, an output 301 for the present filtered sample $P_t^P$ where the noise and the noise peaks are extremely thoroughly eliminated.

The assembly 200 includes:

a first sub-assembly 210 for evaluating the probability $\beta_t^P$ of absence of noise peaks, and a second sub-assembly 220 for ultimately evaluating the present temporally filtered sample $P_t^P$.

The first sub-assembly receives the present noisy sample $I_t^P$ and spatially filters it by way of the spatial filter G, at 101, in order to supply the smoothed present sample $G_t^P$. This first sub-assembly also receives the last filtered causal sample $I_{t-1}^c$ and the evaluated value of the noise standard deviation $\sigma_B$.

The noisy present sample $I_t^P$ and the smoothed present sample $G_t^P$ are applied to a first adder 103 which provides the first difference $\Delta 1$; the noisy present sample $I_t^P$ and the last noisy causal sample $I_{t-1}^c$ are applied to a second adder 104 which supplies the second difference $\Delta 2$.

The differences $\Delta 1$ and $\Delta 2$ are entered in tables (L.U.T) 105 and 106, respectively, and also the noise standard deviation $\sigma_B$, in order to supply said differences normalized by the noise standard deviation in conformity with the respective relations (14) and (15).

The sign of the normalized differences is compared in the sign comparator 107 which supplies a signal 0 or 1 in order to ensure that the value of the presumptive measurement concerning the presence of a noise peak $Z_t^P$ is evaluated:

as 0 if the signs are different, and as≠0 if the signs are identical.

The values of the normalized differences $\Delta 1$, $\Delta 2$ are applied to the blocks 108 and 109, respectively, for the evaluation of absolute values; subsequently, the probability $\beta_t^P$ is calculated in the table (L.U.T) 110, in conformity with the command from the comparator 107, as a non-strictly decreasing function $F_t^P$ of the presumptive value $Z_t^P$ in conformity with the relation (10).

The second sub-assembly 220 receives the present noisy sample $I_t^P$, the last (or previous) filtered causal sample $P_{t-1}^c$, and the inverse of the sum of the causal weights, referred to as $K_{t-1}^c$, as has already been described. The second sub-assembly 220 includes a table (L.U.T) 111 which contains the value of the probability of absence of a peak $\beta_t^P$ and the value of the inverse of the sum of the causal weights $K_{t-1}^c$ in order to supply the weight $W_t^P$ evaluated in conformity with the relation (23).

The second sub-assembly subsequently includes adders 112, 114 and a multiplier 113 for evaluating the present filtered sample $P_t^c$ while utilizing the relation (24b). To this end, the adder 112 receives the present noisy sample $P_{t-1}^c$ and the last filtered causal sample $P_{t-1}^c$ and supplies the difference $I_t^P - I_{t-1}^c$ which is multiplied by the weight $W_t^P$ in the multiplier 113 whose output is added, by means of the adder 114, to the last filtered causal sample $P_{t-1}^c$. As a result, the value of the present filtered sample $P_t^P$ becomes available on the output 301 of the sub-assembly 220 in conformity with the formula (24b).

All references cited herein, as well as the priority document French Patent Application 9609307 filed Jul. 24, 1996, are incorporated herein by reference in their entirety and for all purposes to the same extent as if each individual publication or patent or patent application was specifically and individually indicated to be incorporated by reference in its entirety for all purposes.

What is claimed is:

1. A method for temporal filtering of noise in an image of a sequence of digital images, each image being in the form of two-dimensional matrices of pixels, the sequence being formed from a first instant until a present instant (t), said pixels having intensity values which correspond to each instant and are referred to as noisy samples, the method comprising:

evaluating for a given pixel location a temporally filtered sample ($P_t^P$) of the present instant by combining into a first combination the temporally filtered sample ($P_{t-1}^c$) of the previous instant multiplied by a first weight ($W_1$) and a noisy sample ($I_t^P$) of the present instant multiplied by a second weight ($W_2$), wherein the second weight is a function of a probability value ($\beta_t^P$) concerning absence of a noise peak in the noisy sample.

2. A method as claimed in claim 1 further comprising:

evaluating a presumptive measure of presence of a noise peak ($Z_t^P$), wherein the presumptive measure is larger than or equal to 0, wherein the presumptive measure in evaluated as the minimum of a first absolute value and of a second absolute value, wherein the first absolute value is of a first difference between the noisy sample ($I_t^P$) of the present instant and a present spatially smoothed sample ($G_t^P$), and wherein the second absolute value is of a second difference between the noisy samples of the present instant ($I_t^P$) and the previous instant, and determining said second weight ($W_2$) by evaluating said probability value ($\epsilon_t^P$) concerning absence of a noise peak in the noisy sample of the present instant as a non-strictly decreasing function ($F_t^P$), larger than 0 and smaller than or equal to 1, of the presumptive measure of presence of a noise peak ($Z_t^P$).

3. A method as claimed in claim 2 wherein the first absolute value of the first difference and the second absolute value of the second difference are normalized by noise standard deviations evaluated for the samples used to form said first and second differences, respectively.

4. A method as claimed in claim 1 further comprising evaluating the temporally filtered sample ($P_{t-1}^c$) of the previous instant by combining into a second combination the noisy samples ($I_j^c$) from the first instant until the previous instant of the sequence multiplied by respective causal weights ($b_j^c$), said second combination being normalized by the sum of said causal weights.

5. A method as claimed in claim 4 further comprising:
evaluating the first weight ($W_1$) for multiplying the temporally filtered sample of the previous instant in said first combination by summing the causal weights $$\left(\sum_{j=to}^{j=t-1} b_j^c = W_1\right)$$

of the second combination, and
normalizing said first combination by the sum of the first and the second weights ($W_1+W_2$).

6. A method as claimed in claim 5 further comprising:
evaluating a third weight ($W_t^P$) by dividing the second weight ($W_2$) by the sum of the first and the second weights ($W_1+W_2$), and
wherein the step of evaluating the temporally filtered sample ($P_t^P$) of the present instant further comprises
combining into a third combination the temporally filtered sample of the previous instant and a difference between the noisy sample ($I_t^P$) of the present instant and the temporally filtered sample of the previous instant, and
multiplying said difference by said third weight ($W_t^P$).

7. An image filtering device comprising:
means for receiving a series of noisy samples ($I_j$), relating to a given pixel location in successive images of a sequence of images, each image in the sequence being in the form of a two-dimensionl matrix of pixels, the sequence being formed from a first instant until a present instant (t),
a first calculation assembly for supplying a temporally filtered sample ($P_{t-1}^c$) of the previous instant (t-1), and
a second calculation assembly further comprising
a first sub-assembly with calculation modules for evaluating a function of a probability value ($\beta_t^P$) concerning absence of a noise peak in the noisy sample ($I_t^P$) of the present instant, and
a second sub-assembly with calculation modules for evaluating a first linear combination of the temporally filtered sample ($P_{t-1}^c$) of the previous instant multiplied by a first weight ($W_1$) and a noisy sample ($I_t^P$) of the present instant multiplied by a second weight ($W_2$), which is determined by said function of the probability value ($\beta_t^P$) calculated by the first sub-assembly, said first combination being normalized by the sum of the first and the second weights.

8. A device as claimed in claim 7 wherein the first calculation assembly further comprises means for evaluating the temporally filtered sample ($P_{t-1}^c$) of the previous instant as a second combination of noisy samples ($I_j^c$) preceding the last instant, multiplied by respective causal weights ($b_j^c$), and normalized by the sum of said causal weights, and
wherein the second calculation assembly further comprises means for evaluating the first weight ($W_1$) assigned to the temporally filtered sample ($P_{t-1}^c$) of the previous instant as the sum of said causal weights $$\left(\sum_{j=to}^{j=t-1} b_j^c = W_1\right).$$

9. A device for the processing of medical images comprising:
a system for supplying data of a sequence of images in the form of two-dimensional matrices of pixels having digitized intensity values,
a system for the display of the data, and
an image processing system which has access to the image data and to the display system, and which comprises an image filtering device as claimed in claim 7.

10. A method as claimed in claim 2 further comprising evaluating the temporally filtered sample ($P_{t-1}^c$) of the previous instant by combining into a second combination the noisy samples ($I_j^c$) from the first instant until the previous instant of the sequence multiplied by respective causal weights ($b_j^c$), said second combination being normalized by the sum of said causal weights.

11. A method as claimed in claim 3 further comprising evaluating the temporally filtered sample ($P_{t-1}^c$) of the previous instant by combining into a second combination the noisy samples ($I_j^c$) from the first instant until the previous instant of the sequence multiplied by respective causal weights ($b_j^c$), said second combination being normalized by the sum of said causal weights.

12. A method as claimed in claim 10 further comprising:
evaluating the first weight ($W_1$) for multiplying the temporally filtered sample of the previous instant in said first combination by summing the causal weights $$\left(\sum_{j=to}^{j=t-1} b_j^c = W_1\right)$$

of the second combination, and
normalizing said first combination by the sum of the first and the second weights ($W_1+W_2$).

13. A method as claimed in claim 11, further comprising:
evaluating the first weight ($W_1$) for multiplying the temporally filtered sample of the previous instant in said first combination by summing the causal weights $$\left(\sum_{j=to}^{j=t-1} b_j^c = W_1\right)$$

of the second combination, and
normalizing said first combination by the sum of the first and the second weights ($W_1+W_2$).

14. A method as claimed in claim 12 further comprising:

evaluating a third weight ($W_t^P$) by dividing the second weight ($W_2$) by the sum of the first and the second weights ($W_1+W_2$), and wherein the step of evaluating the temporally filtered sample ($P_t^P$) of the present instant further comprises combining into a third combination the temporally filtered sample of the previous instant and a difference between the noisy sample ($I_j^P$) of the present instant and the temporally filtered sample of the previous instant, and multiplying said difference by said third weight ($W_j^P$).

15. A method as claimed in claim 13 further comprising:

evaluating a third weight ($W_t^P$) by dividing the second weight ($W_2$) by the sum of the first and the second weights ($W_1+W_2$), and wherein the step of evaluating the temporally filtered sample ($P_t^P$) of the present instant further comprises combining into a third combination the temporally filtered sample of the previous instant and a difference between the noisy sample ($I_t^P$) of the present instant and the temporally filtered sample of the previous instant, and multiplying said difference by said third weight ($W_t^P$).

16. A device for the processing of medical images comprising:

a system for supplying data of a sequence of images in the form of two-dimensional matrices of pixels having digitized intensity values, a system for the display of the data, and an image processing system which has access to the image data and to the display system, and which comprises an image filtering device as claimed in claim 7.

* * * * *